Nov. 28, 1967     V. C. DELL     3,355,130
ANTI-SQUEEZE MODE CONTROL SURFACE MECHANISM
Filed Dec. 10, 1965     3 Sheets-Sheet 1

VERNON C. DELL
INVENTOR.

BY J. M. St. Amand
ATTORNEY

Nov. 28, 1967    V. C. DELL    3,355,130
ANTI-SQUEEZE MODE CONTROL SURFACE MECHANISM
Filed Dec. 10, 1965    3 Sheets-Sheet 3

VERNON C. DELL
INVENTOR.

BY J. M. St. Amand
ATTORNEY

United States Patent Office 3,355,130
Patented Nov. 28, 1967

3,355,130
ANTI-SQUEEZE MODE CONTROL SURFACE MECHANISM
Vernon C. Dell, Corona, Calif., assignor to the United States of America as represented by the Secretary of the Navy
Filed Dec. 10, 1965, Ser. No. 513,060
7 Claims. (Cl. 244—3.21)

ABSTRACT OF THE DISCLOSURE

A mechanism using only three drive actuators for control of four individual steering surfaces of a missile or the like in roll, pitch and yaw, and mechanical mixing thereof with positive "squeeze mode" lockout using a set of gimbals with mechanical linkage between the gimbals and each of the individual steering surfaces.

The invention herein described may be manufactured and used by or for the Government of the United States of America for governmental purposes without the payment of any royalties thereon or therefor.

This invention relates to missile control surfaces or fins, and more particularly to a control fin drive mechanism which allows mechanical mixing of roll, pitch and yaw control signals.

Frequently the attitude of a missile is controlled by a set of four fins which are located in the tail section, amidships as primary lifting surfaces, or in the forward section as canards. These fins are usually set 90° apart and may be oriented vertically and horizontally or at the 45° midpositions between vertical and horizontal. If differential motion of the fins is desired for roll control, then at least one opposite pair of fins must not be solidly fastened on the same shaft. Generally the position of each fin during a flight is the net result of the roll, pitch, and yaw signals from the guidance and stabilization systems. Each drive unit of a fin "sees" its share of the signal after electronic mixing, limiting and other functions are performed on it. This can give rise to a condition known as "squeeze mode" in which one pair of oppositely located fins are positioned to cause a rolling moment in one direction and the other pair positioned to cause a roll moment of lesser degree or one in the opposite direction.

The present invention overcomes disadvantages of previous systems in providing a new system which fills a long existing need in the art by means of all-mechanical roll, pitch, and yaw mixing, and positive squeeze mode lockout (i.e., prevents control surface positions that result in opposing forces) using only three actuators for four control surfaces instead of the usual four actuators required in prior systems. Reliability is improved by minimizing the number of parts and thru all-mechanical three-axis mixing.

It is an object of the invention to provide a new steering and control mechanism for the fins of a vehicle in air or water.

Another object of the invention is to provide all-mechanical roll, pitch, and yaw mixing using only three actuators.

A further object of the invention is to provide a control surface mechanism which prevents control surface positions that result in opposing forces for control of any roll stabilized, cruciform winged vehicle.

Other objects and many of the attendant advantages of this invention will become readily appreciated as the same becomes better understood by reference to the following detailed description when considered in connection with the accompanying drawings wherein.

Referring now to the drawings, like reference characters refer to like parts in each of the figures.

Figure 1:
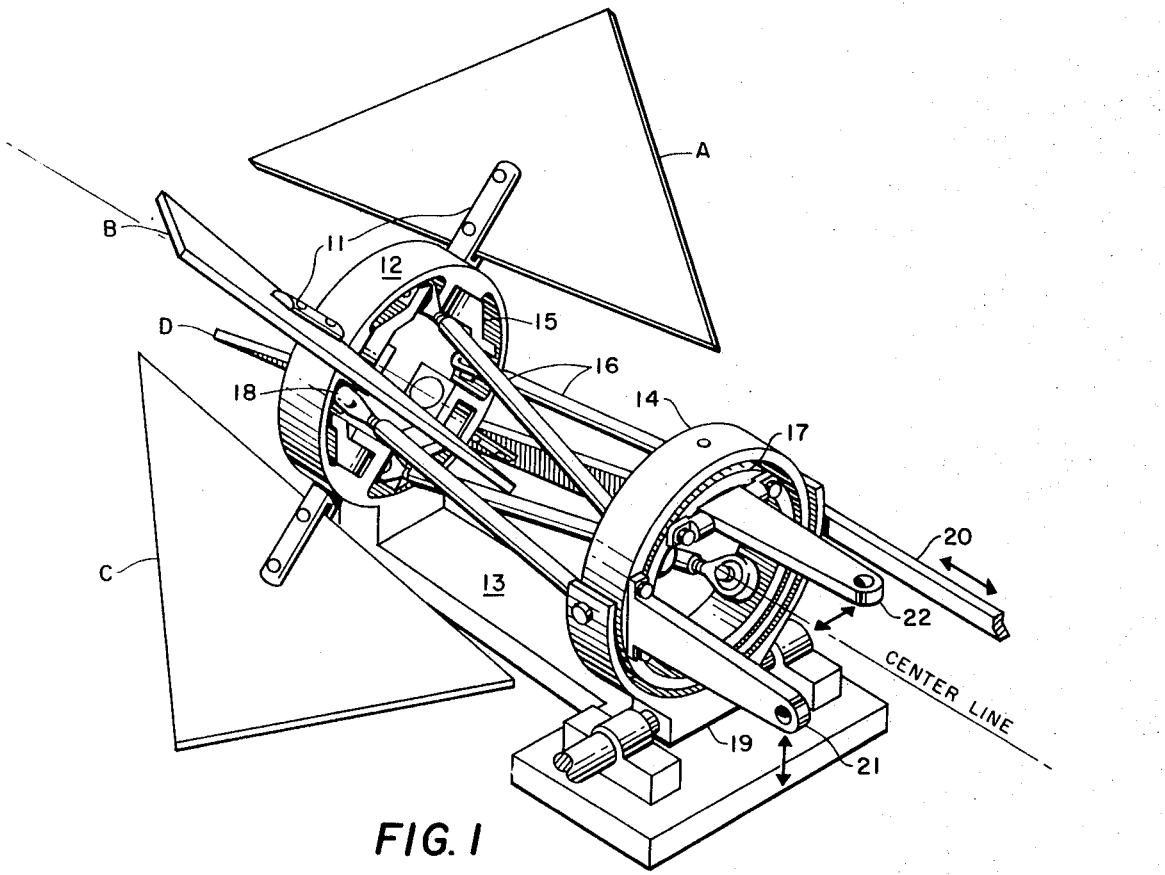
FIG. 1 is a perspective view of an embodiment of the invention with the control fins all in a neutral position.
Figure 2:
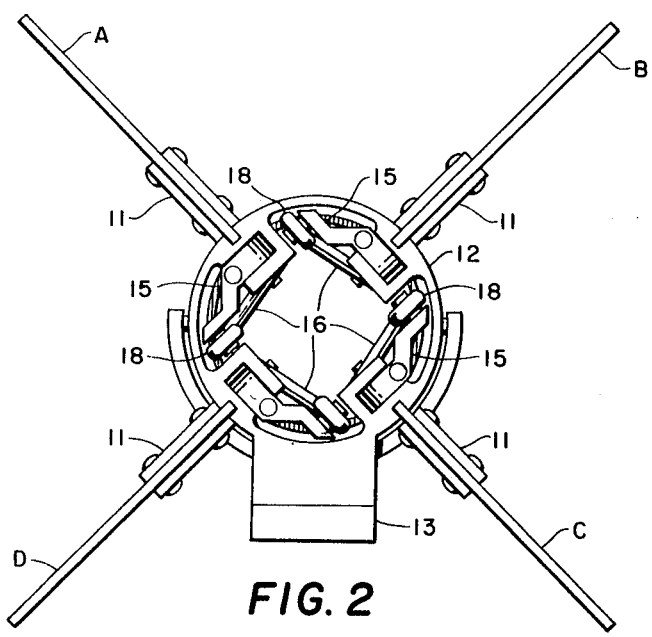
FIG. 2 is a tail-end view of the control system of FIG. 1.

As shown in FIGS. 1 and 2, four control fins A, B, C, and D are mounted so that their control shafts 11 are all in a single plane and aligned radially and perpendicularly with the centerline of the mechanism and the vehicle (not shown) in which it is mounted. Each shaft 11 is rotatably mounted in a support ring 12 on base 13 and is connected by means of a crank arm 15 and a link 16 to the inner ring 17 of a set of gimbals 14 so that when the inner ring 17 is perpendicular to the centerline, the line connected ends 18 of crank arms 15 on the control shafts 11 are also in a plane perpendicular to the centerline. In the position shown in FIGS. 1 and 2, the fins are all in a neutral mode. Gimbals set 14 is pivotally mounted on a hinge mount 19 attached to base 13. Gimbals 14 can be positioned by means of actuator arms 20, 21, and 22. The actuator arms can be moved in either direction as shown in FIG. 1. When actuator arm 20 is moved as indicated in FIG. 1, the motion of gimbal set 14 due to the hinging action of hinge mount 19 is not completely longitudinal but involves a slight curving motion which is relatively insignificant thus resulting in movement of the gimbal set in a substantially longitudinal direction.

Figure 3:
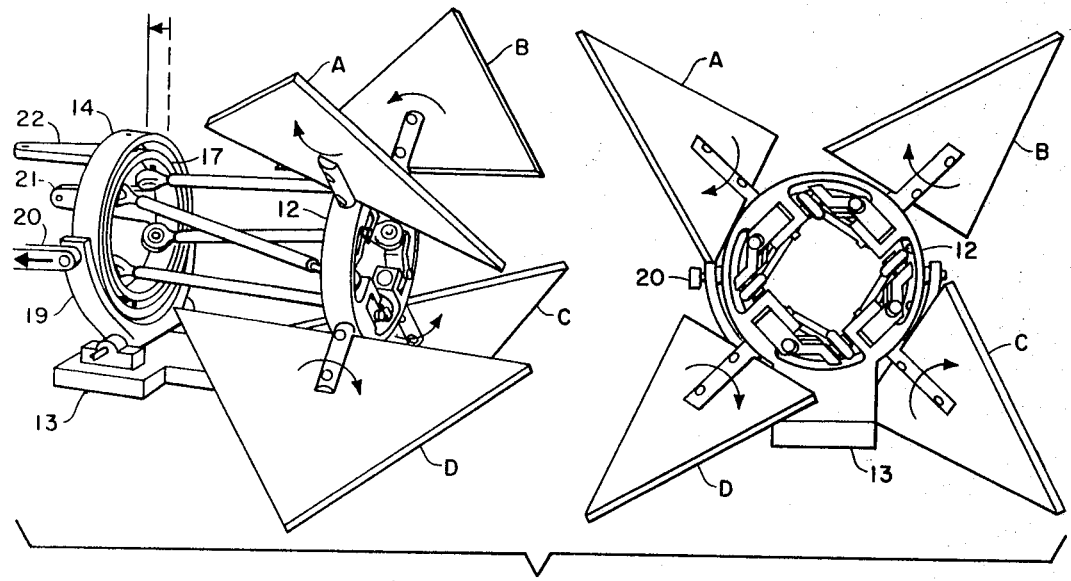
FIG. 3 shows the mechanism and fins in a position to produce a positive or clockwise rolling moment.
Figure 4:
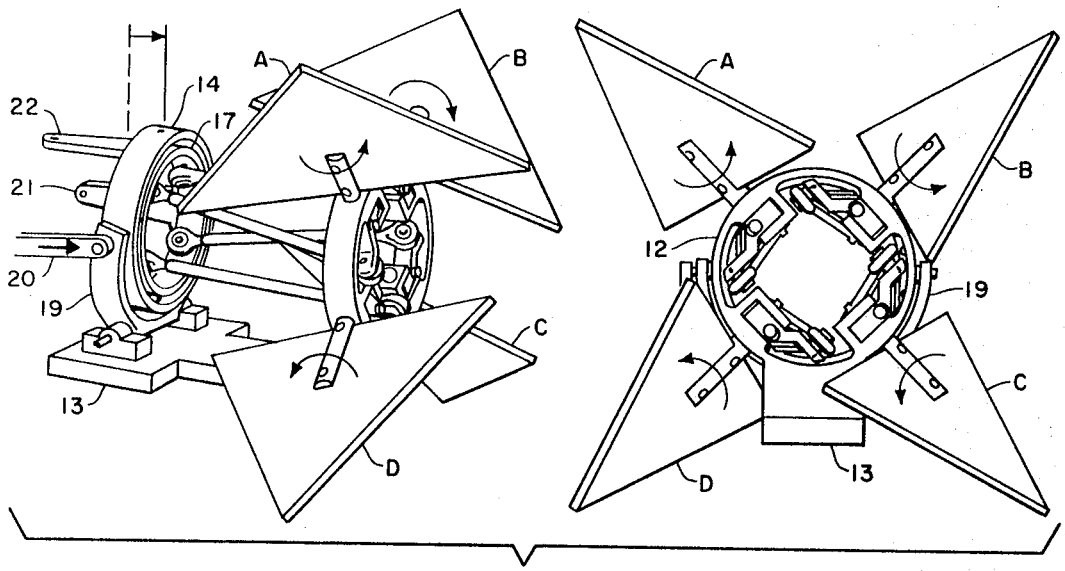
FIG. 4 shows the mechanism and fins in a position to produce a negative or counterclockwise rolling moment.

When the set of gimbals 14, including inner gimbal ring 17, is moved longitudinally rearward by means of roll control actuator arm 20, as shown in FIG. 3, the fin control shafts 11 via links 16 and crank arms 15 are all rotated clockwise in the same direction. These deflections produce lift loads on the fin surfaces which will cause a positive or clockwise rolling moment. If the set of gimbals, while remaining perpendicular to the centerline, is moved longitudinally forward by means of actuator arm 20, as shown in FIG. 4, the fins will be rotated in a counterclockwise direction to produce a negative or counterclockwise rolling moment.

Figure 5:
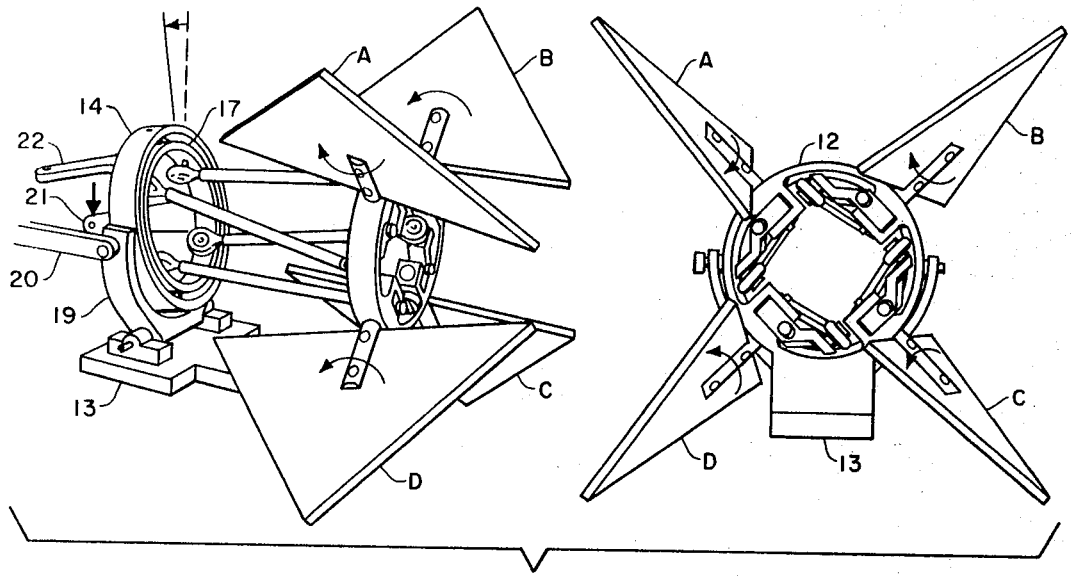
FIG. 5 shows the mechanism and fins in position to produce negative yaw or a resultant force to the right.

When the gimbal set 14, including inner ring 17 to which links 16 are connected, is tilted about its center by means of a downward force on actuator arm 21 so that the lower side of ring 17 is moved forward while the opposite portion of the ring moves rearward, as shown in FIG. 5, the fins will be moved (i.e., fins A and B will be rotated clockwise, and fins C and D will be rotated counterclockwise) so that their lift forces form a negative yaw or resultant force to the right normal to the centerline or axis. By reversing the direction of the force against the yaw control actuator arm 21 so as to move it in the opposite direction, past its neutral position, the fins will be moved to a positive yaw mode (i.e., fins A and B rotated in a counterclockwise direction and fins C and D rotated in a clockwise direction).

Figure 6:
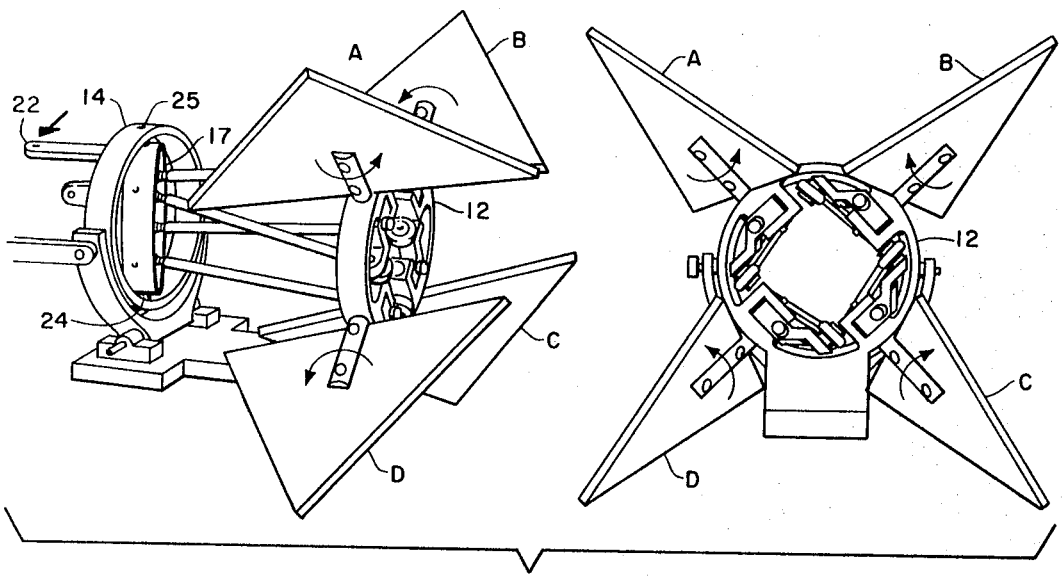
FIG. 6 shows the mechanism and fins in a position to produce positive pitch or resultant force downward against the fins.

If inner gimbal ring 17 is turned on its pivot points 24 and 25 so that one side is moved forward while the other side is moved rearward by means of a force on control actuator arm 22 as shown in FIG. 6, the fins will be moved so as to produce a positive pitch or resultant force downward (i.e., fins A and D rotated counterclockwise while fins B and C are rotated clockwise). When the force against pitch control actuator arm 22 is reversed to move ring 17 in the opposite direction past its neutral position, the fins will be moved to a negative pitch mode to produce a force upward (i.e., fins A and D rotated clockwise while fins B and C are rotated counterclockwise).

The various forces against actuator arms 20, 21, and 22 control the gimbal position and can be made simultaneously to give mechanical mixing of roll, pitch, and yaw signals and prevent squeeze mode operation.

Obviously many modifications and variations of the present invention are possible in the light of the above teachings. It is therefore to be understood that within the scope of the appended claims the invention may be practiced otherwise than as specifically described.

What is claimed is:

1. A roll, pitch, and yaw mixing, and positive squeeze mode lockout steering and control mechanism for roll-stabilized missiles, comprising:
   (a) a mount means having a defined longitudinal axis,
   (b) first, second, third, and fourth pivot means equidistantly spaced and rotatably mounted about the longitudinal axis of said mount means such that the axes of rotation of said pivot means are aligned radially in a single plane perpendicular to said longitudinal axis,
   (c) first, second, third, and fourth steering surface means affixed to the radially outward ends of respective said pivot means,
   (d) a gimbals control means mounted with its center substantially on said mount means longitudinal axis for angular movement about its center and longitudinal movement in the general direction of said longitudinal axis,
   (e) first, second, third, and fourth linkage means connecting respectively the radially inward ends of respective first, second, third, and fourth pivot means to respective first, second, third, and fourth points equidistantly spaced about said gimbals control means such that any movement of any of said points in the direction of said longitudinal axis will cause reciprocal directional rotation of respective said pivot means about their axes of rotation depending upon the longitudinal direction of movement of said points.

2. A device as in claim 1 wherein said pivot means are shafts mounted on a support ring in a cruciform position.

3. A device as in claim 1 wherein said linkage means consists of crank arms having one end connected to respective said pivot means and the other ends connected by links to respective said points on said control means.

4. A device as in claim 1 wherein said linkage means are connected to respective points on the inner ring of said gimbals.

5. A device as in claim 1 wherein said control means is mounted on a hinge mount on said mount means for said substantially longitudinal movement of said entire control means in the direction of said longitudinal axis.

6. A device as in claim 1 wherein an aperture is provided along said longitudinal axis.

7. A device as in claim 1 wherein three actuator means are connected to move said gimballed control means for imparting forces to give roll, pitch and yaw control, respectively, to said steering surfaces via said linkage and pivot means and mechanical mixing of roll, pitch, and yaw forces with positive squeeze mode lockout.

References Cited
UNITED STATES PATENTS

| | | | |
|---|---|---|---|
| 2,868,478 | 1/1959 | McCloughy | 244—3.21 X |
| 2,974,620 | 3/1961 | Malick et al. | 114—23 |
| 3,104,081 | 9/1963 | Arnett | 244—3.21 |
| 3,195,462 | 7/1965 | Petre | 244—3.21 X |
| 3,245,352 | 4/1966 | Summers | 244—3.23 |

BENJAMIN A. BORCHELT, *Primary Examiner.*

W. C. ROCH, T. H. WEBB, *Assistant Examiners.*